United States Patent [19]

Wörner

[11] 3,948,373
[45] Apr. 6, 1976

[54] CLUTCH DISK FOR MOTOR VEHICLE MAIN CLUTCHES

[75] Inventor: Günter Wörner, Rommelshausen, Germany

[73] Assignee: Daimler-Benz Aktiengesellschaft, Germany

[22] Filed: July 25, 1974

[21] Appl. No.: 491,657

[30] Foreign Application Priority Data
July 28, 1973   Germany............................ 2338394

[52] U.S. Cl............ 192/106.2; 192/70.17; 64/27 F
[51] Int. Cl.²................... F16D 69/00; F16D 13/68
[58] Field of Search............ 192/106.1, 106.2, 30 V, 192/70.16, 70.17; 64/27 F

[56] References Cited
UNITED STATES PATENTS

| | | | |
|---|---|---|---|
| 1,734,101 | 11/1929 | Wemp................ | 192/106.1 |
| 2,276,416 | 3/1942 | Nutt.................. | 192/106.2 |
| 2,571,291 | 10/1951 | Reed.................. | 192/106.2 X |
| 3,223,214 | 12/1965 | Kuivinen............ | 64/27 F X |
| 3,327,820 | 6/1967 | Maurice............. | 192/106.2 X |
| 3,578,121 | 5/1971 | Maurice............. | 192/106.2 |
| 3,817,362 | 6/1974 | Rist................... | 192/106.1 |
| 3,863,747 | 2/1975 | Werner et al....... | 192/106.2 |

FOREIGN PATENTS OR APPLICATIONS
62,494   6/1968   Germany.................. 192/106.2

Primary Examiner—Samuel Scott
Assistant Examiner—Lance W. Chandler
Attorney, Agent, or Firm—Craig & Antonelli

[57] ABSTRACT

A clutch disk for motor vehicle main clutches, in which a disk member carrying the friction lining is torsionally elastically connected with a hub member, whereby several springs or spring sets with separate damping devices are provided and the springs are retained in windows of one of the two parts that are torsionally elastically connected with each other and cooperate with larger windows in the other of these two parts; the start of operation of at least one of the damping devices is thereby controlled by a plate-like sheet-metal control member; at least one of the springs or spring sets is thereby retained in the hub portion and the larger windows coordinated to these springs are provided in the lateral sheet metal members connected with the disk member.

8 Claims, 3 Drawing Figures

CLUTCH DISK FOR MOTOR VEHICLE MAIN CLUTCHES

The present invention relates to a clutch disk for motor vehicle main clutches, in which a disk member carrying the friction linings is torsionally elastically connected with a hub member, whereby several springs or spring sets with separate damping devices are provided and the springs are retained in windows provided at one of the two parts torsionally elastically connected with each other and cooperate with larger windows in the other part, and whereby the start of operation of at least one damping device is controlled by a plate-like sheet-metal control member which engages into the corresponding windows.

With the known clutch disks, the springs or spring sets are retained in windows of the two plate-like lateral sheet metal members which are non-rotatably connected with each other to rotate in unison and which are operatively connected with the disk member carrying the friction linings. The springs then cooperate with larger windows which are located in the hub flange. The latter is additionally provided with apertures for the bolts which rigidly connect the two plate-like lateral sheet metal members with each other and with the disk member.

This known arrangement has far-reaching disadvantages. At the outset, only a limited space for the different windows is available in the hub flange.

The choice of the springs and/or the angle of rotation coordinated to the spring stages is therefore limited. Furthermore, the construction of the clutch disk becomes additionally complicated in that the damping devices, with the exception of the device provided for the idling speed, have to be combined on separate hub portions of the sheet metal control members. The manufacture and the assembly becomes more expensive in this manner.

The present invention is concerned with the task to avoid the described disadvantages. Consequently, a clutch disk is to be realized which provides a greater freedom in the selection of the springs and spring stages for the design engineer. Furthermore, the present invention aims at so further simplifying the construction that a simple manufacture and assembly results.

The underlying problems are solved according to the present invention in connection with the aforementioned clutch disks in that at least one of the springs or spring sets is retained in the hub part and the larger windows coordinated to these springs are provided in the plate-like lateral sheet metal members connected with the disk part.

This construction according to the present invention entails the advantage that the larger windows are now distributed from an overall point of view over the hub flange and the lateral sheet metal members. It is quite within the purview of the present invention if several springs or spring sets are retained in the hub flange. Under certain circumstances, one may even arrive at an alternating arrangement of the springs of the different spring stages. The larger windows for the springs may now be arranged far more readily, they may under certain circumstances even overlap—as viewed in the axial direction. The design engineer therefore has a great deal more freedom in the selection of the spring stages, of the spring characteristics and of the angle of rotation.

The inventive concept is applicable—as must be particularly emphasized—in principle to any desired spring or to each spring set in clutch disks quite generally. With those clutches, in which the start of operation of a damping device is controlled by a plate-like sheet metal control member, the present invention prefers a solution according to which each spring cooperating with a sheet metal control member is retained in a flange of the hub member. One thereby obtains the additional advantage that now all elements of the damping device or devices can be assembled by mounting over the hub member. Complicated shapes and configurations for the plate-like sheet metal control member are thereby no longer required. To that extent, the manufacture and assembly are simplified quite considerably.

Finally, it is additionally proposed that the sheet metal control member surrounds the spring coordinated thereto by means of a balcony-like indentation or embossment which also projects into the larger window in the lateral sheet metal member disposed on the same side. In this manner, one realizes a simple lateral retention for the springs.

Of course, with the construction according to the present invention, the sheet metal control member may also be so constituted by a corresponding play or clearance advance with respect to the windows that a so-called "advanced damping" results. Also the arrangement of several plate-like sheet metal control members is feasible. As to the rest, the further advantage also results that the friction damping of the first damping device—and also of the possibly still following devices—remains effective respectively over the entire range of rotation. This means that the following damping devices can build up always on the preceding damping device or devices. This results in more light-weight springs or in general in a smaller construction of the respectively following damping devices.

Accordingly, it is an object of the present invention to provide a clutch disk for motor vehicle main clutches which avoids by simple means the aforementioned shortcomings and drawbacks encountered in the prior art.

Another object of the present invention resides in a clutch disk for motor vehicle main clutches which ensures greater freedom in the selection of the springs and/or the angles of rotation coordinated to the spring stages.

A further object of the present invention resides in a clutch disk for motor vehicle main clutches which results in a simplified construction, rendering less costly the manufacture and assembly thereof.

A still further object of the present invention resides in a clutch disk of the type described above in which the larger windows for the springs can be more readily arranged in the various parts.

Another object of the present invention resides in a clutch disk for motor vehicle main clutches which permits more light-weight springs and smaller constructions of at least some of the damping devices.

These and further objects, features and advantages of the present invention will become more apparent from the following description when taken in connection with the accompanying drawing which shows, for purposes of illustration only, one embodiment in accordance with the present invention, and wherein.

Figure 1:
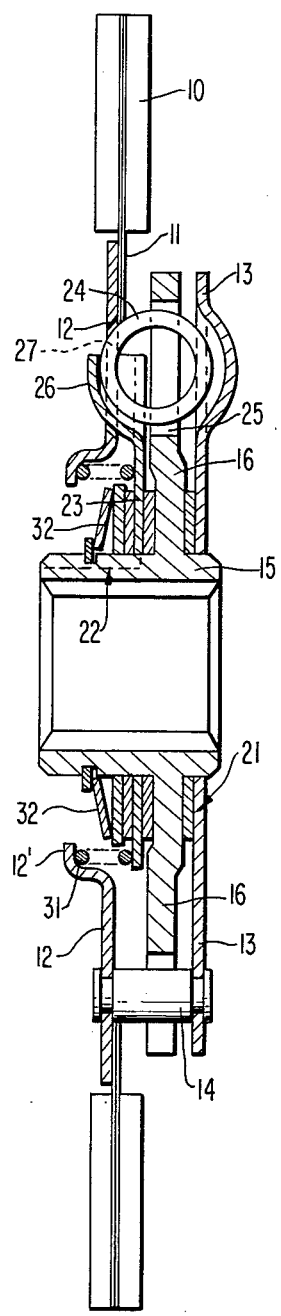
FIG. 1 is a cross-sectional view through a clutch disk according to the present invention, taken along line I—I of FIG. 3.
Figure 2:
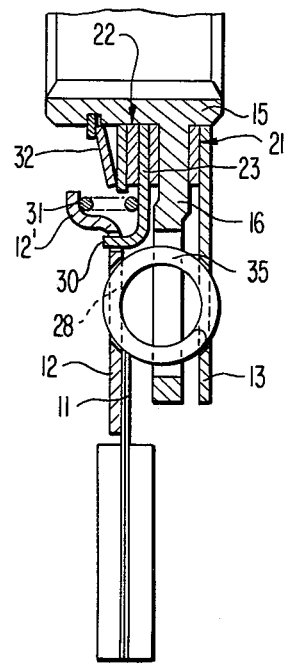
FIG. 2 is a cross-sectional view of the clutch disk according to the present invention, taken along line II—II of FIG. 3.
Figure 3:
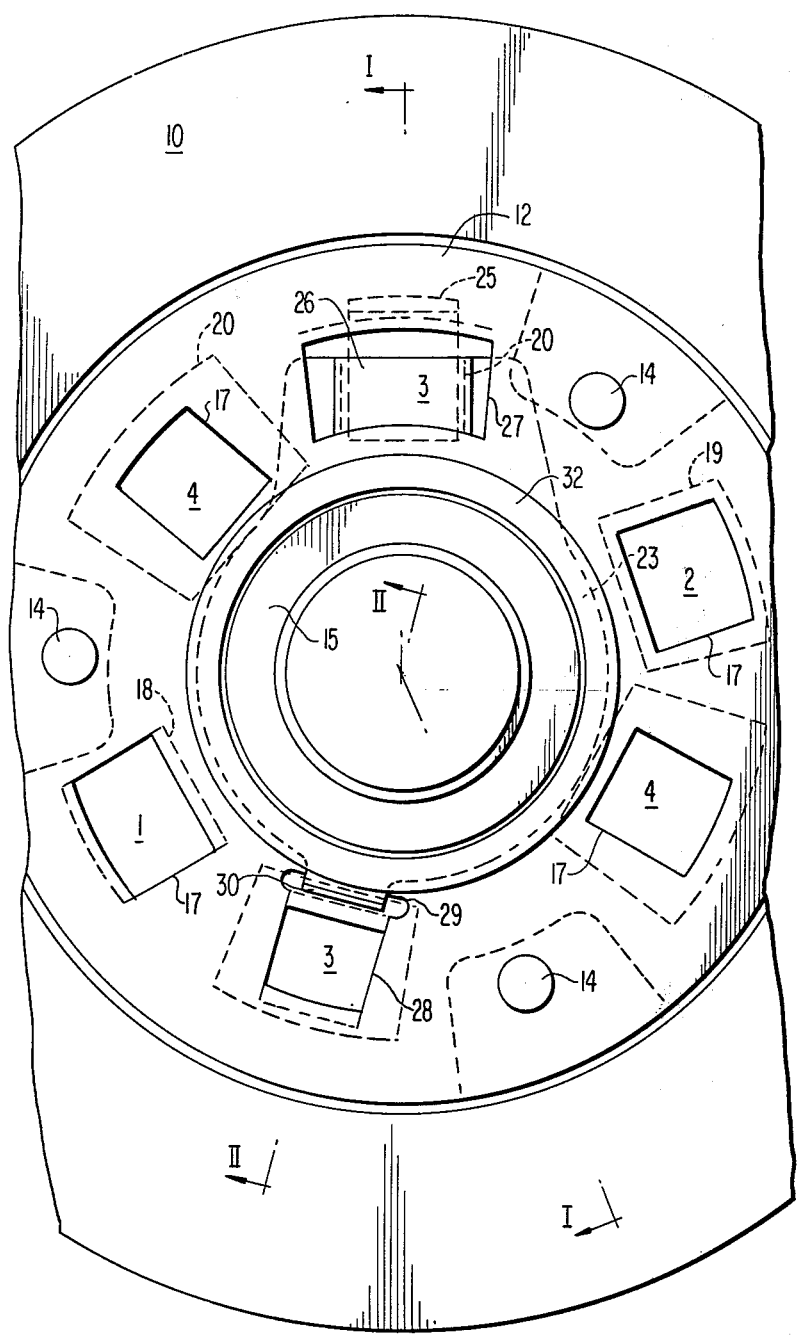
FIG. 3 is a side elevational view of the clutch disk in accordance with the present invention, illustrating the same in a simplified manner.

Referring now to the drawing wherein like reference numerals are used throughout the various views to designate like parts, according to FIGS. 1 to 3, a clutch disk 11 carrying the friction linings 10 is rigidly connected with the plate-like lateral sheet metal members 12 and 13 by means of bolts 14 so that the members 12 and 13 are connected with each other and with the clutch disk 11. This entire system 11, 12, 13 is torsionally elastically connected in a known manner with the hub member 15 by means of several spring stages; the hub member 15 includes a hub flange 16 which is disposed intermediate the two lateral sheet metal members 12 and 13. The springs of the individual spring stages are thereby retained in corresponding windows provided in the lateral sheet metal members 12 and 13 whereas they cooperate with larger windows in the hub flange 16 which are larger by amounts corresponding to the angle of rotation. This is true in particular for the spring stages 1, 2 and 4 (FIG. 3). Whereas with the spring stage 1 the windows 17 in the lateral sheet metal members 12 and 13 and the windows 18 in the hub flange 16 are of identical size (FIG. 3), it can be seen that with the spring stages 2 and 4, the windows 19 and 20 arranged in the hub flange 16 assume a considerably larger dimension in the circumferential direction than the windows 17 in the lateral members 12 and 13.

Two damping mechanisms generally designated by reference numerals 21 and 22 (FIGS. 1 and 2) are coordinated to the clutch disk 11. The former is intended in a known manner for the damping of the idling vibrations. The start of operation of the latter is determined by a plate-like sheet metal control member 23 to which is coordinated a separate control spring 24. This control spring 24, in contrast to the other springs, is retained in a window 25 of the hub flange 16. The spring 24 is laterally guided by a balcony-like indentation or embossment 26 in the sheet metal control member 23 so that it cannot fall out. This indentation or embossment 26 extends up to into the corresponding window 27 provided in the lateral sheet metal member 12 which is constructed considerably larger. It can be readily seen from FIG. 3 that the large windows 27 for the control springs 24 and the windows 20 for the springs of the fourth stage almost contact one another—as viewed in the axial direction. Such a construction is possibly only by the arrangement thereof according to the present invention in different parts.

With respect to the spring of the third spring stage, the same is analogously true which has already been stated with respect to the spring stages 1, 2, and 4. However, it should be mentioned in connection therewith that the window 28 in the lateral sheet metal member 12 which retains the spring 35 thereof, is provided in its radially inwardly disposed area with an enlargement 29 in the circumferential direction, into which engages the sheet metal control member 23 by means of a lateral bent-off portion 30 (FIG. 2). A so-called "advanced damping" can be attained by a corresponding clearance advance in the circumferential direction in the manner already described herein. The sheet metal control member 23 also serves for the support of a coil 31 (FIGS. 1 and 2) which on the other hand, is supported at a pot-shaped indentation 12' of the lateral sheet metal member 12 and which serves for the actuation of the first damping device 21. A cup spring 32 is provided for the second damping device 22 which, on the other hand, is supported at a hub member 15.

FIGS. 1 and 2 illustrate well that all parts of the damping devices 21 and 22 can be threaded axially over the hub member 15. As a result thereof, a very accurate centering can be achieved, and the assembly is quite considerably simplified. In that regard, the present invention contributes to a considerable reduction in cost.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clutch disk for motor vehicle main clutches, in which a disk member carrying friction linings which is operatively connected with lateral members, is torsionally elastically connected with a hub member, and which includes several spring means having separate damping means, said spring means being retained in window means provided in one of two parts torsionally elastically connected with each other and cooperating with larger window means provided in the other of said two parts, and control means for controlling the start of operation of at least one of the damping means, characterized in that at least one of the spring means is retained in the hub member and the larger window means coordinated to said last-mentioned spring means is provided in the lateral members connected with the disk member, and in that the control means includes a laterally bent-off portion, a further window means provided in one of said lateral members including a circumferential enlargement engaged by said bent-off portion.

2. A clutch disk for motor vehicle main clutches, in which a disk member carrying friction linings which is operatively connected with lateral members, is torsionally elastically connected with a hub member, and which includes several spring means having separate damping means, said spring means being retained in window means provided in one of two parts torsionally elastically connected with each other and cooperating with larger window means provided in the other of said two parts, and control means for controlling the start of operation of at least one of the damping means, characterized in that at least one of the spring means is retained in the hub member and the larger window means coordinated to said last-mentioned spring means is provided in lateral members connected with the disk member, and in that said control means is a sheet metal control member engaging into the corresponding window means.

3. A clutch disk according to claim 2, characterized in that said spring means provide various spring sets.

4. A clutch disk according to claim 1, characterized in that each spring means cooperating with a control means is retained in a flange of the hub member.

5. A clutch disk for motor vehicle main clutches, in which a disk member carrying friction linings which is operatively connected with lateral members, is torsionally elastically connected with a hub member, and which includes several spring means having separate damping means, said spring means being retained in window means provided in one of two parts torsionally elastically connected with each other and cooperating with larger window means provided in the other of said two parts, and control means for controlling the start of operation of at least one of the damping means, characterized in that at least one of the spring means is retained in the hub member and the larger window means coordinated to said last-mentioned spring means is provided in the laterally members connected with the disk member, each spring means cooperating with a control means is retained in a flange of the hub member, and in that the control means includes a plate-like control member and surrounds the spring means coordinated thereto by means of a balcony-like indentation which also projects into the larger window means in the lateral member disposed on the same side.

6. A clutch disk according to claim 5, characterized in that said spring means provide various spring sets.

7. A clutch disk according to claim 5, characterized in that said control means is a sheet metal control member engaging into the corresponding window means.

8. A clutch disk for motor vehicle main clutches, in which a disk member carrying friction linings which is operatively connected with lateral members, is torsionally elastically connected with a hub member, and which includes several spring means having separate damping means, said spring means being retained in window means provided in one of two parts torsionally elastically connected with each other and cooperating with larger window means provided in the other of said two parts, and control means for controlling the start of operation of at least one of the damping means, characterized in that at least one of the spring means is retained in the hub member and the larger window means coordinated to said last-mentioned spring means is provided in the lateral members connected with the disk member, and in that the control means includes a plate-like control member and surrounds the spring means coordinated thereto by means of a balcony-like indentation which also projects into the larger window means in the lateral member disposed on the same side.

* * * * *